United States Patent
Goto et al.

(10) Patent No.: US 9,692,944 B2
(45) Date of Patent: Jun. 27, 2017

(54) IMAGE PROCESSING APPARATUS, IMAGE PROCESSING METHOD, INKJET PRINTING APPARATUS AND DATA GENERATING APPARATUS

(75) Inventors: Fumitaka Goto, Tokyo (JP); Akitoshi Yamada, Yokohama (JP); Tomokazu Ishikawa, Kawasaki (JP); Tohru Ikeda, Yokohama (JP); Nobutaka Miyake, Yokohama (JP); Makoto Torigoe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 12/966,781

(22) Filed: Dec. 13, 2010

(65) Prior Publication Data
US 2011/0285777 A1  Nov. 24, 2011

(30) Foreign Application Priority Data
May 24, 2010  (JP) .................... 2010-118670

(51) Int. Cl.
*H04N 1/60* (2006.01)
*B41J 2/21* (2006.01)
*H04N 1/401* (2006.01)

(52) U.S. Cl.
CPC .......... *H04N 1/6041* (2013.01); *B41J 2/2139* (2013.01); *B41J 2/2146* (2013.01); *H04N 1/4015* (2013.01); *H04N 1/6033* (2013.01); *B41J 2202/21* (2013.01)

(58) Field of Classification Search
CPC ................................................. B41J 2/2139

USPC ........................................................... 347/15
See application file for complete search history.

(56) References Cited

U.S. PATENT DOCUMENTS

| | | | |
|---|---|---|---|
| 6,025,929 A | 2/2000 | Nakajima et al. | |
| 6,980,326 B2 | 12/2005 | Tsuchiya et al. | |
| 7,016,530 B2 | 3/2006 | Saito et al. | |
| 7,034,844 B2 | 4/2006 | Akiyama et al. | |

(Continued)

FOREIGN PATENT DOCUMENTS

| | | |
|---|---|---|
| JP | 10-13674 | 1/1998 |
| JP | 2004-42369 A | 2/2004 |

(Continued)

OTHER PUBLICATIONS

U.S. Appl. No. 12/966,799, filed Dec. 13, 2010. Applicants: Tomokazu Ishikawa, et al.

(Continued)

*Primary Examiner* — Manish S Shah
*Assistant Examiner* — Jeffrey C Morgan
(74) *Attorney, Agent, or Firm* — Fitzpatrick, Cella, Harper & Scinto

(57) ABSTRACT

An image processing apparatus, an image processing method, an inkjet printing apparatus and a data generating apparatus are provided that can reduce, when a plurality of types of inks are used to print an image, the color unevenness that is caused by the variation of ejecting characteristics among a plurality of nozzles. A conversion table for correcting, based on an ejecting characteristic, a multi dimensional color printed by ejecting at least two types of inks on a common region on a printing medium is used to correct a plurality of color signals corresponding to these inks.

13 Claims, 9 Drawing Sheets

(56) References Cited

U.S. PATENT DOCUMENTS

| | | | |
|---|---|---|---|
| 7,075,679 B2 | 7/2006 | Goto et al. | |
| 7,079,152 B2 | 7/2006 | Akiyama et al. | |
| 7,266,239 B2 | 9/2007 | Akiyama et al. | |
| 7,274,491 B2 | 9/2007 | Yamada et al. | |
| 7,290,845 B2 * | 11/2007 | Tanaka | 347/15 |
| 7,342,684 B2 | 3/2008 | Imafuku et al. | |
| 7,411,707 B2 | 8/2008 | Ikeda | |
| 7,420,705 B2 | 9/2008 | Yamada et al. | |
| 7,450,281 B2 | 11/2008 | Torigoe et al. | |
| 7,591,521 B2 * | 9/2009 | Aruga | 347/13 |
| 7,636,178 B2 | 12/2009 | Nakatani et al. | |
| 7,639,399 B2 | 12/2009 | Ikeda | |
| 7,643,178 B2 | 1/2010 | Yamada et al. | |
| 7,688,489 B2 | 3/2010 | Nagoshi et al. | |
| 7,750,921 B2 | 7/2010 | Akiyama et al. | |
| 7,869,092 B2 | 1/2011 | Nakatani et al. | |
| 7,912,280 B2 | 3/2011 | Miyagi et al. | |
| 2004/0257596 A1 * | 12/2004 | Mestha | H04N 1/6025 358/1.9 |
| 2005/0062778 A1 * | 3/2005 | Tanaka | H04N 1/4057 347/15 |
| 2008/0144060 A1 | 6/2008 | Ishikawa | |
| 2008/0239353 A1 | 10/2008 | Hori et al. | |
| 2008/0239355 A1 | 10/2008 | Goto et al. | |
| 2008/0239410 A1 | 10/2008 | Hashii et al. | |

FOREIGN PATENT DOCUMENTS

| | | |
|---|---|---|
| JP | 2006-51677 A | 2/2006 |
| JP | 2007-320240 A | 12/2007 |
| JP | 2009-234014 A | 10/2009 |

OTHER PUBLICATIONS

U.S. Appl. No. 12/966,823, filed Dec. 13, 2010. Applicants: Akitoshi Yamada, et al.

U.S. Appl. No. 12/966,757, filed Dec. 13, 2010. Applicants: Makoto Torigoe, et al.

U.S. Appl. No. 12/966,265, filed Dec. 13, 2010. Applicants: Nobutaka Miyake, et al.

U.S. Appl. No. 12/966,769, filed Dec. 13, 2010. Applicants: Tohru Ikeda, et al.

U.S. Appl. No. 12/966,743, filed Dec. 13, 2010. Applicants: Ryosuke Iguchi, et al.

U.S. Appl. No. 12/966,848, filed Dec. 13, 2010. Applicants: Senichi Saito, et al.

U.S. Appl. No. 12/966,837, filed Dec. 13, 2010. Applicants: Mitsuhiro Ono, et al.

Japanese Office Action dated Jul. 30, 2013 issued in corresponding Japanese Application No. 2010-118670.

* cited by examiner

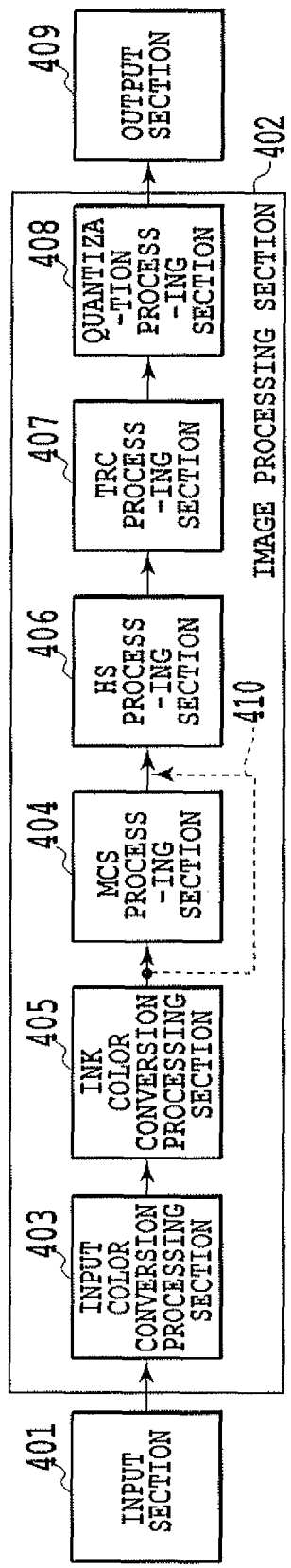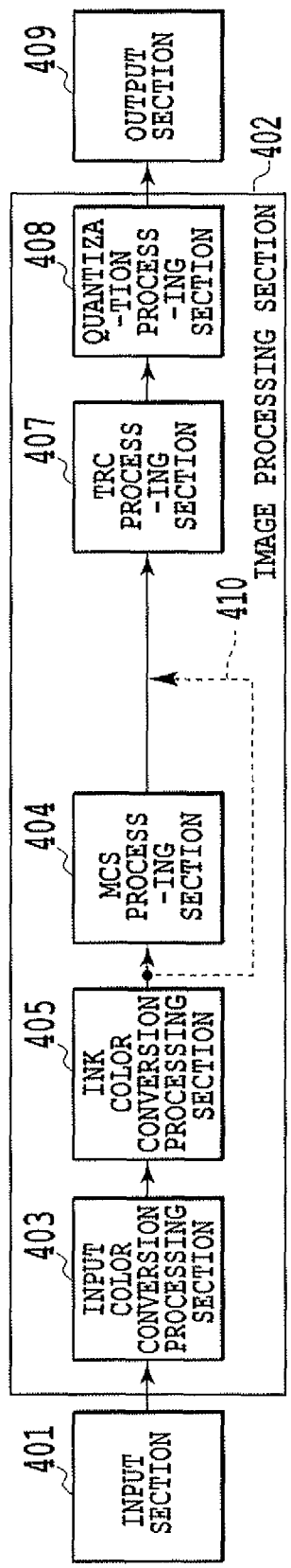

IMAGE PROCESSING APPARATUS, IMAGE PROCESSING METHOD, INKJET PRINTING APPARATUS AND DATA GENERATING APPARATUS

BACKGROUND OF THE INVENTION

Field of the Invention

The present invention relates to an image processing apparatus, an image processing method, an inkjet printing apparatus and a data generating apparatus. In particular, the present invention relates to an image processing for reducing the density unevenness caused by the variation in the ejecting amounts among a plurality of nozzles for ejecting ink.

Description of the Related Art

Printing heads used in ink jet-type printing apparatuses may vary, due to errors during the manufacture thereof for example, among a plurality of nozzles with regard to the ejecting amount. Such a variation tends to cause the resultant printed image to have density unevenness.

Conventionally, as a processing for reducing such a density unevenness, the use of a head shading technique as disclosed in Japanese Patent Laid-Open No. H10-013674 (1998) has been known. This head shading corrects image data depending on the information regarding the ejecting amounts of the individual nozzles. By this correction, the number of ink dots that are finally printed can be increased or reduced to thereby adjust the density in the resultant printed image.

However, when the head shading technique as described above is used to reproduce a multi dimensional color by superposing two or more types of inks, a so-called color difference may be caused where a region printed by a nozzle having a varied ejection amount has a different color from an originally-intended color to be printed. For example, a case will be described where dots by cyan ink and magenta ink are printed to print a blue image. In a region where the variation of the ejection amount of nozzles causes the printing of magenta ink of a higher-than-standard ejection amount, magenta ink dots are larger than a standard size. At the same time, the correction by the head shading causes a lower-than-standard number of dots of magenta ink to be printed in this region. As a result, this region includes both of cyan dots and other dots consisting of blue areas and the surrounding magenta areas. Consequently, a color of this region differ from a color of a region including blue dots by cyan ink and magenta ink for which no variation of the ejection amount are cased (an originally-intended color to be printed).

SUMMARY OF THE INVENTION

The present invention provides an image processing apparatus, an image processing method, an inkjet printing apparatus and a data generating apparatus that can reduce, when a plurality of types of inks are used to print an image, a color difference in a multi dimensional color image due to the variation of ejecting characteristics among a plurality of nozzles.

In the first aspect of the present invention, there is provided an image processing apparatus for converting a color signal corresponding to image data represented by a plurality of elements to a plurality of color signals corresponding to a plurality of inks at least including a first ink and a second ink having a different color from that of the first ink, wherein the color signals corresponding to the plurality of inks are a plurality of color signals for ejecting the plurality of inks from a printing head having a first nozzle array in which a plurality of nozzles for ejecting the first ink are arranged in a predetermined direction and a second nozzle array in which a plurality of nozzles for ejecting the second ink are arranged in the predetermined direction, the plurality of inks being ejected for performing a printing on a printing medium, the image processing apparatus comprising:

a storage unit configured to store a conversion table used to reduce a color difference of a multi dimensional color printed by at least the first ink and the second ink, the color difference being caused by variation of ejecting characteristics in a predetermined direction of a nozzle group of the first nozzle array and a nozzle group of the second nozzle array, respectively used to print on a common region of the printing medium, among a plurality of nozzle groups obtained by dividing the first nozzle array and the second nozzle array to a plurality of groups, the storage unit storing the conversion table so as to correspond to the plurality of nozzle groups;

a first conversion unit configured to convert the color signal corresponding to image data represented by the plurality of elements to the color signals corresponding to the plurality of inks; and a second conversion unit configured to use the conversion table to convert the color signals converted by the first conversion unit.

In the second aspect of the present invention, there is provided an image processing method for converting a color signal corresponding to image data represented by a plurality of elements to a plurality of color signals corresponding to a plurality of inks at least including a first ink and a second ink having a different color from that of the first ink, comprising:

a first conversion step of converting the color, signal corresponding to image data represented by the plurality of elements to the color signals corresponding to the plurality of inks; and a second conversion step of using a conversion table to convert the color signals converted by the first conversion step, wherein the color signals corresponding to the plurality of inks are a plurality of color signals for ejecting the plurality of inks from a printing head having a first nozzle array in which a plurality of nozzles for ejecting the first ink are arranged in a predetermined direction and a second nozzle array in which a plurality of nozzles for ejecting the second ink are arranged in the predetermined direction to perform a printing on a printing medium, and the conversion table is used to reduce a color difference of a multi dimensional color printed by at least the first ink and second ink, the color difference being caused by variation of ejecting characteristics in a predetermined direction of a nozzle group of the first nozzle array and a nozzle group of the second nozzle array, respectively used to print on a common region of the printing medium, among a plurality of nozzle groups obtained by dividing the first nozzle array and the second nozzle array to a plurality of groups, the conversion table corresponding to the plurality of nozzle groups.

In the third aspect of the present invention, there is provided an inkjet printing apparatus for ejecting, from a printing head having a first nozzle array in which a plurality of nozzles for ejecting a first ink are arranged in a predetermined direction and a second nozzle array in which a plurality of nozzles for ejecting a second ink are arranged in the predetermined direction, a plurality of inks including at least the first ink and the second ink to print a printing medium, comprising:

a storage unit configured to store a conversion table, the conversion table being used to reduce a color difference of a multi dimensional color printed by at least the first ink and the second ink, the color difference being caused by variation of ejecting characteristics in a predetermined direction of a nozzle group of the first nozzle array and a nozzle group of the second nozzle array, respectively used to print on a common region of the printing medium, among a plurality of nozzle groups obtained by dividing the first nozzle array and the second nozzle array to a plurality of groups, the storage unit storing the conversion table so as to correspond to the plurality of nozzle groups;

a first conversion unit configured to convert, to the color signals corresponding to the plurality of inks, the color signal that is represented by a plurality of elements and that corresponds to image data to be printed on the printing medium; and a second conversion unit configured to use the conversion table to convert the color signals converted by the first conversion unit.

In the fourth aspect of the present invention, there is provided a data generating apparatus far generating data for performing printing by ejecting, from a printing head having a first nozzle array in which a plurality of nozzles for ejecting a first ink are arranged in a predetermined direction and a second nozzle array in which a plurality of nozzles for ejecting a second ink are arranged in the predetermined direction, a plurality of inks including at least the first ink and the second ink, the plurality of inks being ejected for performing a printing on a printing medium, wherein a conversion table is used to convert a plurality of color signals corresponding to the plurality of inks to thereby generate data for performing the printing on the printing medium, the conversion table being used to reduce a color difference of a multi dimensional color printed by at least the first ink and second ink, the color difference being caused by variation of ejecting characteristics in a predetermined direction of a nozzle group of the first nozzle array and a nozzle group of the second nozzle array, respectively used to print on a common region of the printing medium, among a plurality of nozzle groups obtained by dividing the first nozzle array and the second nozzle array to a plurality of groups, the conversion table corresponding to the plurality of nozzle groups.

According to the present invention, a color signal of an image to be printed by ejecting at least two types of inks on the common region on a printing medium is corrected using a parameter for the correction corresponding to a nozzle printing characteristic. This can consequently reduce, when a plurality of types of inks are used to print an image, the color difference caused by the variation of the printing characteristic among the plurality of nozzles.

Further features of the present invention will become apparent from the following description of exemplary embodiments (with reference to the attached drawings).

BRIEF DESCRIPTION OF THE DRAWINGS

FIG. 4A and FIG. 48 are block diagrams illustrating the configuration of an image processing section in the ink jet printer according to the first and second embodiments of the present invention, respectively;

FIG. 6A and FIG. 68 illustrate the printing of the test color images in Step S502 of FIG. 5A, respectively;

DESCRIPTION OF THE EMBODIMENTS

The following section will describe in detail an embodiment of the present invention with reference to the drawings.

Figure 1:
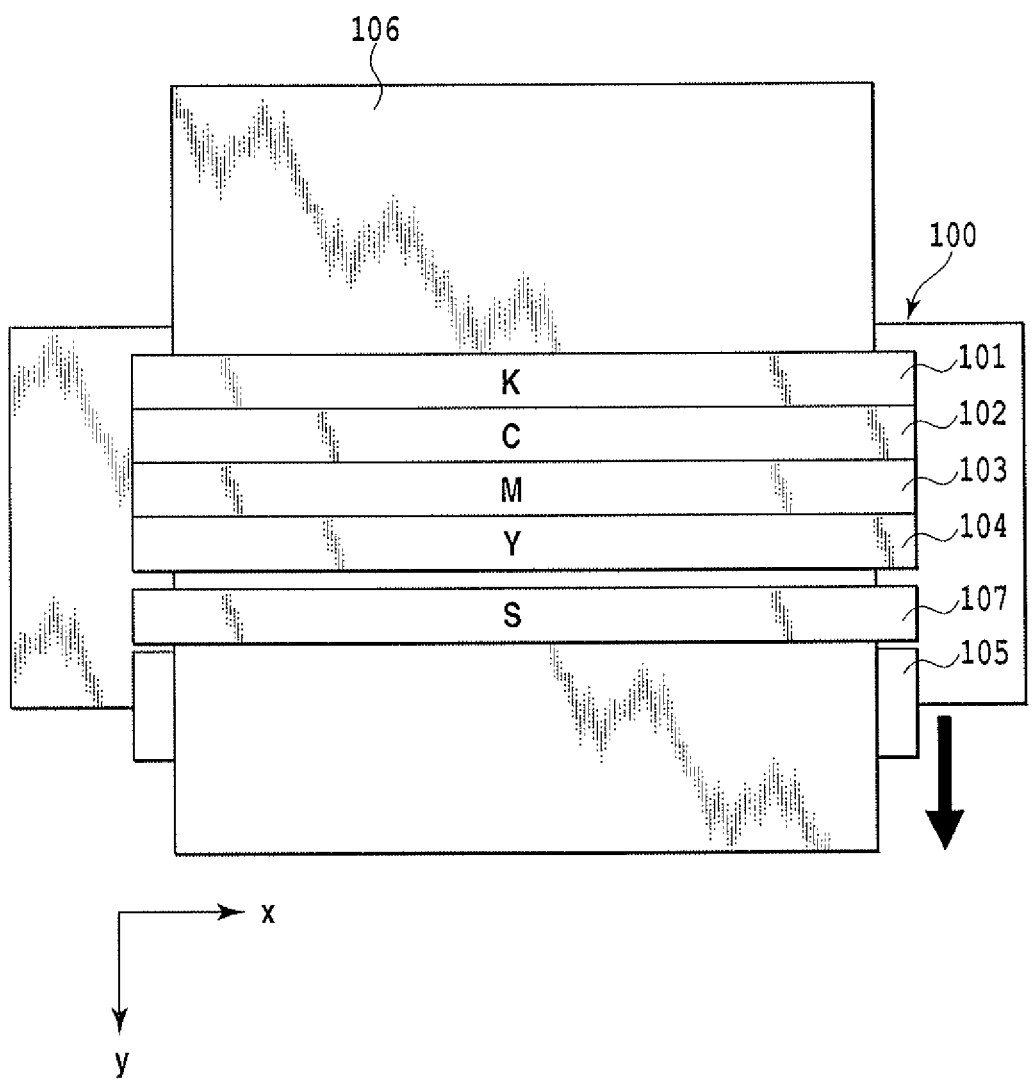
FIG. 1 is a schematic view of an ink jet printer according to one embodiment of the present invention.

FIG. 1 is a schematic view of an ink jet printer (inkjet printing apparatus) according to one embodiment of the present invention. A printer 100 includes, as shown in FIG. 1, printing heads 101 to 101 that are provided on a frame constituting a printer structure. The printing heads 101 to 104 are the so-called full line-type ones in which a plurality of nozzles for ejecting a plurality of inks of black (K), cyan (C), magenta (M), and yellow (Y) are arranged along a predetermined direction in a range corresponding to the width of the printing paper 106, respectively. In the respective nozzle arrays of ink colors, the nozzles are arranged with a resolution of 1200 dpi.

The printing paper 106 as a printing medium is conveyed in the direction in the drawing shown by the arrow by the rotation of the conveying roller 105 (and other rollers (not shown)) by the driving force from a motor (not shown). While the printing paper 106 is being conveyed, the respective plurality of nozzles of the printing heads 101 to 104 eject inks in accordance with the to-be-printed data to thereby sequentially print an image of one raster corresponding to the respective nozzle arrays of the printing heads. At the downstream of the printing heads 101 to 104 in the direction y, a scanner 107 is provided in which reading elements are arranged at a predetermined pitch so as to be parallel with the printing heads 101 to 104. The scanner 107 can read the image printed by the printing heads 101 to 104 to output the image data as RGB multivalued data. By repeating the ink ejection operations through the respective printing heads to the conveyed printing paper, an image of one page can be printed for example. Printing apparatuses to which the present invention can be applied are not limited to the full line-type apparatus as described above. For example, the present invention also can be applied to a so-called serial type printing apparatus for which a printing operation is performed by scanning a printing head in a direction crossing the conveying direction of a printing paper, as can be seen from the description below.

Figure 2:
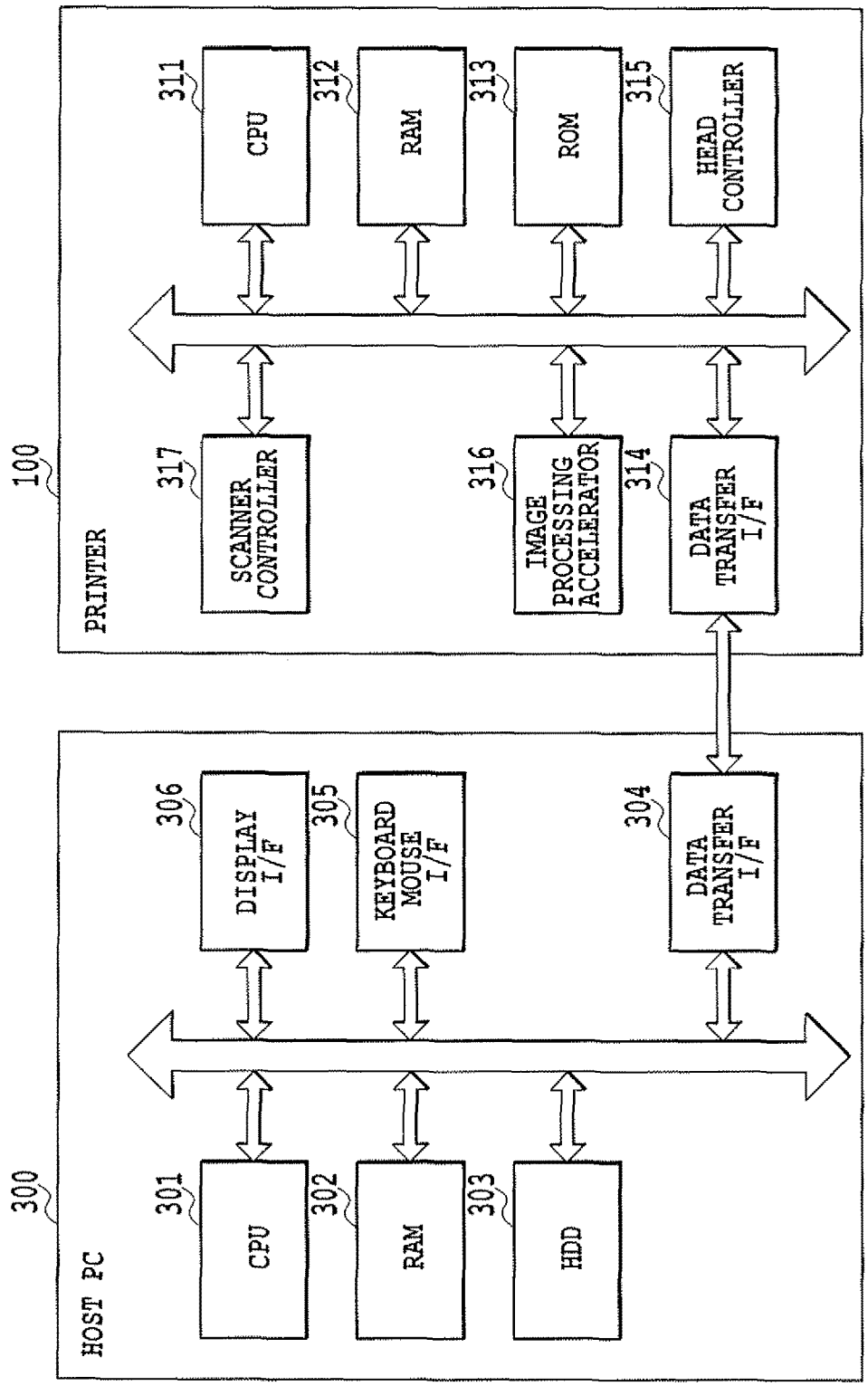
FIG. 2 is a block diagram illustrating a printing system according to one embodiment of the present invention.

FIG. 2 is a block diagram illustrating a printing system according to one embodiment of the present invention. As shown in FIG. 2, this printing system is configured to include: a printer 100 shown in FIG. 1; and a personal computer (PC) 300 as a host computer connected to the printer 100.

The host PC 300 is configured to mainly include the following elements. The CPU 301 carries out a processing in accordance with a program stored in an HDD 303 and a RAM 302 functioning as a storage means. The RAM 302 is a volatile storage that temporarily retains a program and data. The HDD 303 is a non-volatile storage that similarly retains a program and data. A data transfer interface (I/F) 304 controls the transmission and reception of data between the host PC 300 and the printer 100. For example, USB, IEEE1394, or LAN can be used for such a data transmission/reception. A keyboard/mouse I/F 305 is an I/F that controls a Human Interface Device (HID) such as a keyboard or a mouse. A user can perform an input operation through this I/F. A display I/F 306 controls the display in a display (not shown).

On the other hand, the printer 100 is configured to mainly include the following elements. A CPU 311 performs, in accordance with a program retained in a ROM 313 or a RAM 312, the processings of the respective embodiments (which will be described later with reference to the drawings subsequent to FIG. 4A). The RAM 312 is a volatile storage that temporarily retains a program and data. The ROM 313 is a nonvolatile storage that can retain table data or a program used in a processing (which will be described later). A data transfer. I/F 314 controls the data transmission/reception between the printer 100 and the PC 300. A head controller 315 supplies to-be-printed data to the respective printing heads 101 to 104 shown in FIG. 1 and controls the ejecting operation of the printing heads. Specifically, the head controller 315 can be configured to read a control parameter and to-be-printed data from a predetermined address of the RAM 312. Then, when the CPU 311 writes the control parameter and the to-be-printed data to the predetermined address of the RAM 312, a processing is activated by the head controller 315, thereby performing ink ejection through the printing head. The CPU 311 also functions as a printing control means for printing a measurement image (which will be described later). An image processing accelerator 316 is composed by a hardware that performs an image processing at a higher speed than that of the CPU 311. Specifically, the image processing accelerator 316 can be configured to read a parameter and data required for the image processing from a predetermined address of the RAM 312. Then, when the CPU 311 writes the parameter and the data to the predetermined address of the RAM 312, the image processing accelerator 316 is activated, thereby performing the predetermined image processing. In this embodiment, a processing for preparing parameters for a table used in an MCS processing section (which will be described later) is carried out by software of the CPU 311. On the other hand, the image processing for printing including the processing by the MCS processing section is carried out by a hardware processing by the image processing accelerator 316. It is noted that the image processing accelerator 316 is not an essential element and the processing for preparing table parameters and an image processing also may be carried out only by the processing by the CPU 311 depending on the specification of the printer for example. A scanner controller 317 outputs to the CPU 311 RGB data obtained from the individual reading elements of the scanner 107 shown in FIG. 1 while controlling the individual reading elements.

The following description will describe some embodiments for reducing, in the printing system as described above, the color difference of the multi dimensional color caused by the variation of ejecting characteristics among a plurality of nozzles when a plurality of types of inks are used for a printing operation. In the conventional head shading technique where pieces of data for a plurality of different types of inks are individually corrected, in order to overlap the plurality of different types of inks to represent a multi dimensional color, the color may be different from the originally-intended color.

Figure 3A:
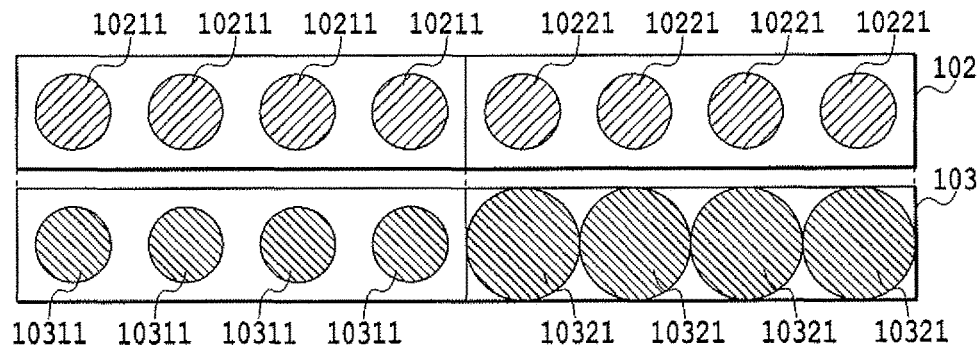
FIG. 3A, FIG. 3B, and FIG. 3C illustrate the color difference caused when a multi dimensional color is represented by overlapping a plurality of different types of inks, respectively.
Figure 3B:
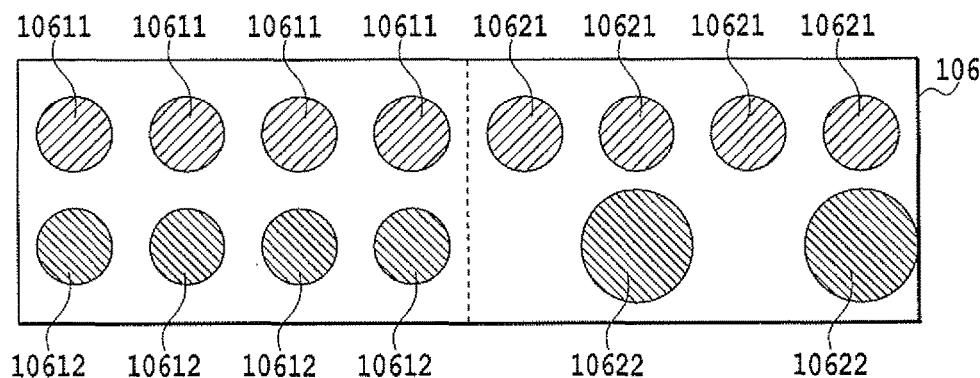
Figure 3C:
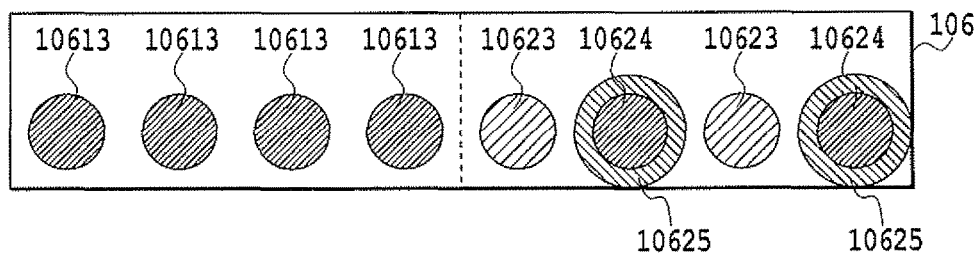

FIG. 3A, FIG. 3B, and FIG. 3C illustrate the occurrence of this color difference. In FIG. 3A, the reference numeral 102 denotes a printing head for ejecting cyan ink as the first ink and the reference numeral 103 denotes a printing head for ejecting magenta ink as the second ink, respectively. In FIG. 3A, for the convenience of simple description and illustration, only eight nozzles in the respective printing heads are shown. That is only eight nozzles are shown from among a plurality of nozzles arranged in the first nozzle array for ejecting cyan ink and the second nozzle array for ejecting magenta ink. In order to explain the color difference caused when the secondary color of blue is printed by cyan ink and magenta ink, only the two printing hands for cyan and magenta are shown. As will be described later, this embodiment assumes that four nozzles in nozzles of each nozzle array constitute one nozzle group (a unit of a nozzle group divided to a plurality of sections).

All of the eight nozzles 10211 and 10221 for cyan ink in the printing head 102 can eject a standard amount of ink. On the other hand, the four nozzles 10311 at the left side in the drawing eject a standard ejection amount of ink and the four nozzles 10321 at the right side eject an amount of ink higher than the standard amount. In FIG. 3A, the right four nozzles in the magenta ink printing head 103 are shown to have a size larger than that of the left nozzles. This is for an easy understanding of the difference of the ejection amount and does not show the relation in the actual nozzle size.

When the use of the printing head having the ejection amount characteristic as described above is combined with the correction of image data by the conventional head shading, the binary data (dots data) corresponding to the nozzles can be eventually btained. If the cyan and magenta dots are individually printed without being overlapped on the printing paper 106 based on the corresponding dot data, these pieces of data are represented as shown in FIG. 3B. The example shown in FIG. 3B illustrates dots obtained by a solid image (i.e., dots obtained by subjecting 100%-duty cyan and magenta image data to the head shading processing to subsequently subject the data to a binarization processing).

FIG. 3B illustrates cyan dots 10611 and 10621 corresponding to the nozzles of the cyan ink printing head 102 and magenta dots 10612 and 10622 corresponding to the magenta ink printing head 103. Among them, the region corresponding to the four nozzle 10321 having a high ejection amount of magenta ink includes a reduced number of dots 10622 obtained by the head shading to correct the image data of the corresponding region. FIG. 3B shows an example in which dots formed by ink ejected from the magenta ink nozzle 10321 having a high ejection amount have a twice area as that of dots when the magenta ink nozzle 10321 has a standard ejection amount. In this case, by the correction by the head shading, the number of dots is reduced by ½ (4 dots→2 dots). The halving of the number of dots when the dot area is twice is for the simple description. In an actual case, the number of dots is determined so as to obtain a standard density by suppressing the increase (decrease) of the density due to the increase (decrease) of the dot area due to the variation of the ejection amount.

FIG. 3C illustrates an example where, based on the dots data obtained in the manner as described above, cyan ink and magenta ink are ejected through the respective printing heads onto the printing paper 106 to print a blue image. In FIG. 3C, the left region (common region) in the printing paper 106 has standard-size blue dots 10613 printed by overlapping cyan ink and magenta ink. On the other hand, the right region (common region) corresponding to the four nozzles 10321 having a high ejection amount of magenta has standard-size cyan dots 10623 and dots of a size larger than the standard size. The latter dots consist of blue areas 10624 obtained by overlapping cyan ink and magenta ink and magenta areas 10625 surrounding the blue areas 10624.

As described above, the right region that corresponds to the nozzles 10321 having a high ejection amount of magenta and that is used to print a blue (solid image) is composed of the following three types of dots or areas.

Two standard size cyan areas (dots) 10623

Two blue areas 10624 by standard size cyan dots formed in larger-than-standard magenta dots Two magenta areas 10625 surrounding the standard size blue areas 10621

In the conventional head shading as described above, cyan image data and magenta image data are individually corrected to adjust the number of the respective dots. The result is that the area of the two cyan areas (dots) 10623=the area of the two blue areas 10624=to the area of the two magenta area 10625. If the color observed by the sum of the light absorption characteristic of the cyan areas 10623 and the light absorption characteristic of the magenta areas 10625 is equal to the color observed by the light absorption characteristic of the blue areas 10624, this region can be recognized to have substantially the same color as that of the blue area 10624.

However, when the multi dimensional color is formed by overlapping a plurality of different types of inks as in the blue area 10624, the color observed by the light absorption characteristic of the resultant area is frequently different from the color observed by the sum of the light absorption characteristics of the areas of the respective plurality of inks. As a result, the entire of the resultant region has a different color from the target standard color. Specifically, due to the variation of the ejecting characteristic of nozzles used for the printing of the same region in the printing paper 106, the blue image of the left half area is undesirably sensed to have a different color from that of the blue image of the right half area.

The variation of the ejection amount among nozzles also causes the variation of the dot size obtained through the respective nozzles in the case of a multivalued printing apparatus such as a four-valued printing apparatus in which the printing is performed based on three types of large, medium, and small dots so that the dot size can be changed. Even when the correction by the conventional head shading is provided, the color difference also may be caused in this case due to the same reason as the above-described one. Thus, the present invention is not limited to a binary printing apparatus and also can be applied to a three valued or more multivalued printing apparatus.

Each embodiment of the present invention described below is to reduce the color difference as described above by performing a correction processing to the image data before quantization that consists of a plurality of combinations of color signals.

(First Embodiment)

FIG. 4A is a block diagram illustrating the configuration of an image processing section in an ink jet printer according to the first embodiment of the present invention. Specifically, this embodiment provides the image processing section by the respective control and processing elements of the printer 100 shown in FIG. 2. The present invention is not limited to this embodiment. For example, the PC 300 shown in FIG. 2 also may constitute the image processing section. Alternatively, a part of the image processing section may be configured by the PC 300 and the other parts may be configured by the printer 100.

As shown in FIG. 4A, an input section 401 outputs image data received from the host PC 300 to an image processing section 402. The image processing section 402 has: an input color conversion processing section 403; a Multi Color Shading (MCS) processing section 404; an ink color conversion processing section 405; and a Head Shading (HS) processing section 406. The image processing section 402 also includes a Tone Reproduction Curve (TRC) processing section 407 and a quantization processing section 408.

In the image processing section 402, the input color conversion processing section 403 firstly converts the input image data received from the input section 401 to image data corresponding to the color reproduction range of the printer. In this embodiment, the image data to be inputted is data showing the color coordinates (R, G, B) in color space coordinates such as sRGB as colors represented by the monitor. The input color conversion processing section 403 converts the respective 8 bit input image data R, G, and B to the image data (R', G', B') within the color reproduction range of the printer. The image data (R', G', B') is color signals composed of three elements. This conversion can be performed by a known method such as a matrix computation processing or a processing using a three dimensional LUT. In this embodiment, a three dimensional lookup table (LUT) is combined with an interpolation computation to perform the conversion processing. In this embodiment, the 8 bit image data handled in the image processing section 402 has a resolution of 600 dpi. The binary data obtained by the quantization by the quantization processing section 408 has a resolution 1200 dpi as described later.

The ink color conversion processing section (first conversion processing section) 405 subjects the image data converted by the input color conversion processing section 403 to a conversion processing for converting the data to color signals corresponding to a plurality of inks used in the printer. The printer 100 in this embodiment uses black (K) ink, cyan (C) ink, magenta (M) ink, and yellow (Y) ink. Thus, the image data of the RCS signals is converted to image data consisting of the respective 8 bit K, C, M, and Y color signals. This color conversion is also carried out by the combination of a three dimensional lookup table and an interpolation computation as in the above-described input color conversion processing section. As described above, other conversion methods such as a matrix computation processing also can be used.

The Multi Color Shading (MCS) processing section (second conversion processing section) 404 subjects the respective 8 bit K, C, M, and Y image data processed by the ink color conversion processing section 405 to a conversion processing for correcting the color difference. This processing is also performed by a three dimensional lookup table as will be described later. This conversion processing can reduce, even when the ejection amount varies among the nozzles of the printing head in the output section 409, the above-described color difference due to the variation. The specific contents of the conversion table for the MCS processing section 404 and a conversion processing using this will be described later.

The Head Shading (HS) processing section 406 receives the image data of the ink color signals to subject the data to a processing for converting the respective pieces of 8 bit data of the respective ink colors to the image data of ink color signals depending on the ejection amounts of the respective nozzles constituting the printing head. Specifically, this processing is the same processing as the above-described conventional head shading processing. In this embodiment, a one dimensional lookup table is used to perform this HS processing to provide an individual correction means for individually correcting the ink color signals corresponding to the respective different types of ink (the respective ink colors) for the respective nozzles or for the respective nozzle groups of predetermined numbers of nozzles. In the present invention, this HS processing section is not required so long as otherwise specified. Specifically, there may be a case where some printer specification allows a sufficient accuracy of the correction processing by the MCS processing section in relation with the memory capacity. In such a case, the correction by the HS processing section also can be provided by the MCS processing section.

A Tone Reproduction Curve (TRC) processing section 407 corrects the image data consisting of the respective 8 bit ink color signals subjected to the HS processing in order to adjust the number of dots printed by the output section 409 with regards to the respective ink colors. Specifically, there may be no linear relation between the number of dots printed on the printing medium and the brightness realized by the number of dots on the printing medium. Thus, in order to make this relation linear, the TRC processing section 407 corrects the respective 8 bit image data to adjust the number of dots to be printed on the printing medium.

The quantization processing section 408 performs a quantization processing on the respective 8 bit 256 valued ink image data processed by the TRC processing section 407 to generate one bit binary data. In this embodiment, the image data is firstly converted to three bit and five valued index data of "0" to "4". This index data of "0" to "4" corresponds to a pattern in which 0 to 4 dots is/are arranged on a pattern of 2 pixels×2 pixels of a resolution of 1200 dpi. The present invention is not limited to this exemplary form of the quantization processing section 408. For example, another form also may be used where 8 bit image data is binarized to directly obtain binary data (dot data). Although this embodiment has used an error diffusion method as a quantization processing method, other pseudo continuous tone processings such as a dither method also can be used.

The output section 409 drives the printing head based on the dot data obtained by the quantization and ejects the respective colors of inks to the printing medium to perform printing. The output section 409 is specifically configured by a printing mechanism including the printing heads 101 to 104 shown in FIG. 1.

Figure 5A:
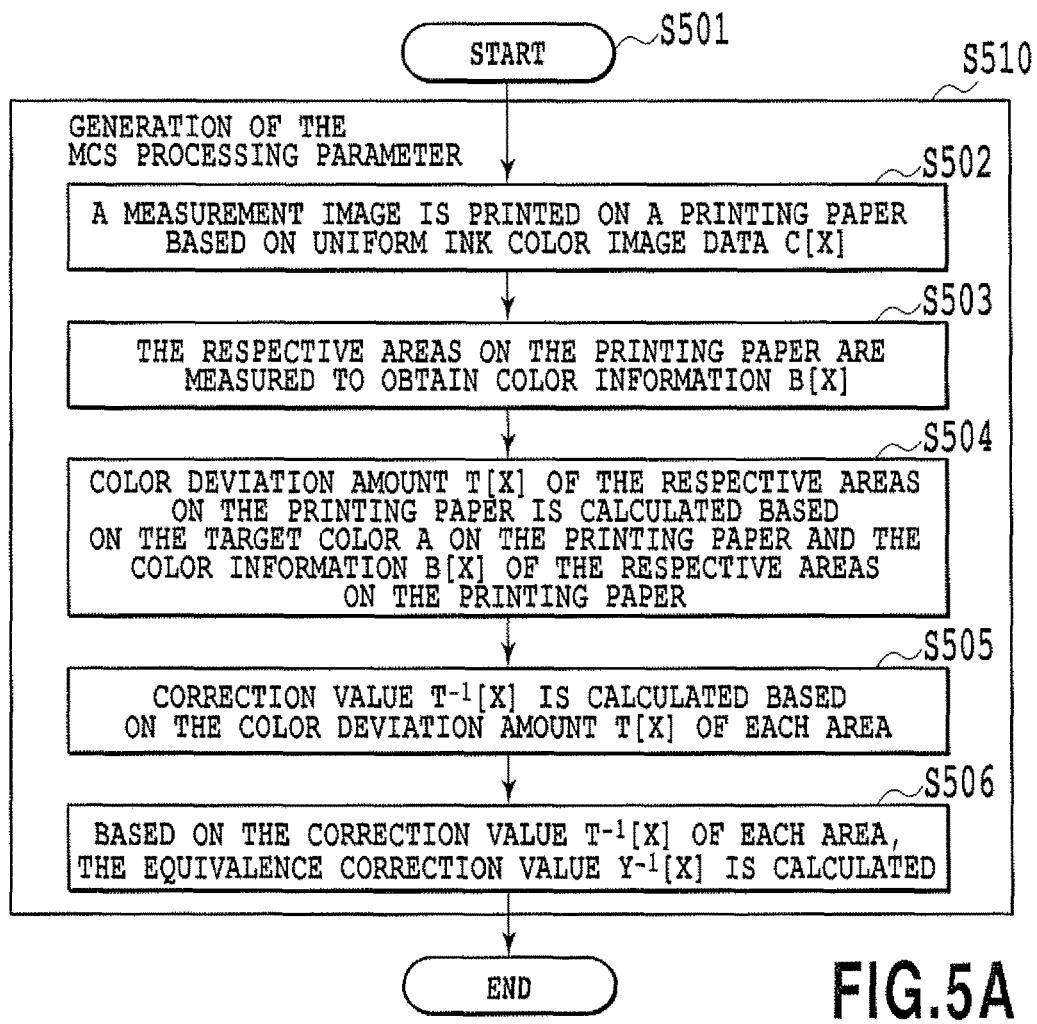
FIG. 5A and FIG. 5B are flowcharts illustrating a processing for generating parameters of the conversion table used by the MCS processing section 404 shown in FIG. 4A and an image processing by the MCS processing section 404 for using the conversion table to generate to-be-printed data, respectively.
Figure 5B:
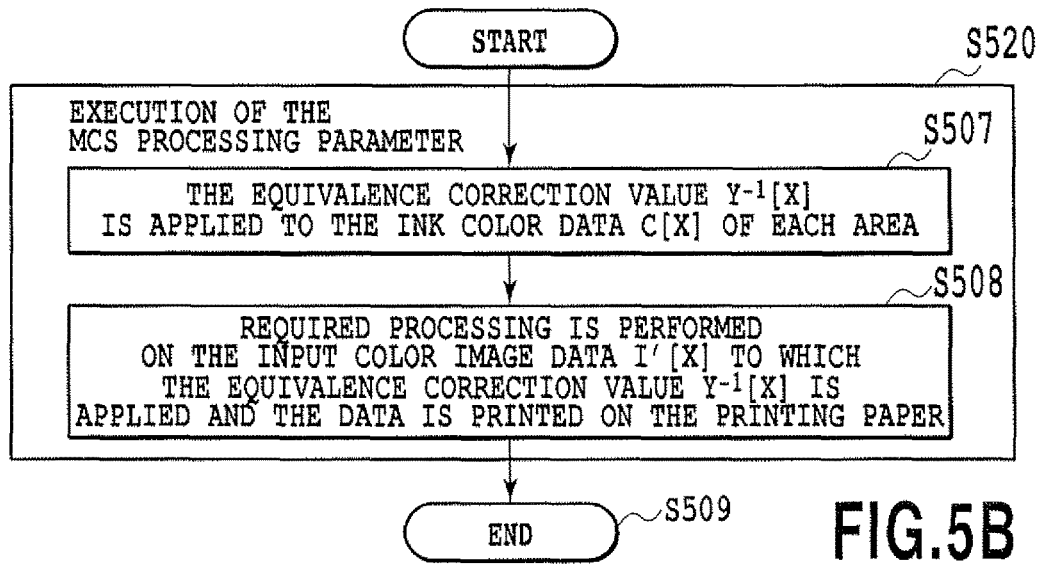

FIG. 5A and FIG. 5B are flowcharts for describing a processing of generating parameters of the conversion table used in the MCS processing section 404 shown in FIG. 4A and a processing by the MCS processing section 904 of using the conversion table in the image processing for generating to-be-printed data, respectively.

A processing S510 shown in FIG. 5A is a processing for generating the parameters of the conversion table that is a three dimensional look table used by the MCS processing section 404 and has Step S502 to Step S506. In this embodiment, the processing S510 is a processing that is carried out at the manufacture of the printer, after the use of the printer for a predetermined period, or after the printing in a predetermined amount. Specifically, the processing S510 also can be performed as a so-called calibration by which table parameters are updated as the contents of the lookup table. A processing S520 shown in FIG. 5B on the other hand is a processing performed by the MCS processing section 404 as a part of the image processing performed by the image processing section 402 shown in FIG. 4A in order to generate the data to be printed by the printer. This processing has Steps S507 and S508. The present invention is not limited to the above exemplary timing at which the processing for generating the table parameters is performed. For example, this processing also may be performed prior to the execution of the processing S520 for printing.

First, the processing to generate the table parameters shown in FIG. 5A will be described.

In this embodiment, after the preparation of the table parameter for the HS processing section 406, the table parameters for the MCS processing section are prepared. Thus, at Step S501 at which this processing is activated, the table parameters for the HS processing section are already generated (or updated). When the nozzles in the magenta ink printing head 103 have a variation of the ejection amount, the table parameters for the HS processing section corresponding to the printing head 103 are generated in the manner as described below. Specifically, as shown in FIG. 3B, such parameters are generated that corrects the number of pieces of dot data corresponding to the four nozzles 1321 of the right half part to a half of the number of pieces of dot data corresponding to the four nozzles 10311 of the left half part. When the cyan ink printing head 102 has the ejection amount characteristic of the respective nozzles shown in FIG. 3A (i.e., when all of the nozzle have a standard ejection amount), the table parameters for the HS processing section are parameters that directly subjects the image data to conversion. As described above, in this embodiment, the table parameters for the HS processing section are generated prior to the generation or update of the table parameter for the MCS processing section. By doing this, the color difference due to the variation among nozzles caused at the generation thereof can be appropriately reduced by a total processing by the MCS processing section and the HS processing section.

First, in Step S502, a test color image (patch) is printed on the printing medium. Namely, based on the combinations of the K, C, M, and Y image data that tend to show an increase of the above-described color difference among the combinations of the K, C, M, and Y image data to be inputted to the MCS processing section, inks are ejected through all nozzles of the respective printing heads shown in FIG. 1 to print the test color image. Specifically, from among the lattice points determined by the combinations of the values obtained by equally dividing the respective R, G, and B of 0 to 255 of the device color space by 17 for example, lattice points are selected that tend to shown an increase of the color difference. Then, the test color image is printed with regard to the combinations of K, C, M, and Y corresponding to these lattice points. The lattice points that tends to show an increase of the color difference can be selected, for example, by knowing in advance a color showing a remarkable color difference such as a combination of R=0, G=0, and B=255 corresponding to the blue image described with reference to FIG. 3A, FIG. 3B, and FIG. 3C to thereby select the combination from among the lattice points determined by the combinations of the values equally divided 17. The device color space of R=0, and B=255 corresponds to K=0, C=255, M=255, and Y=0 of the ink color space for example. The former image data R, G, and B (hereinafter referred to as device image data D[X]) is converted by the ink color conversion processing section 405 to the latter image data K, C, M, and Y (hereinafter referred to as ink color data C[X]). To print the test color image with regard to the combination of R, G, and B corresponding to the lattice points that tend to show an increase of the color difference means to print the test color image for the combination of K, C, M, and Y corresponding to the combination of R, G, and B.

The selection of the lattice points of the color for printing the test color image is not limited to the above example. For example, combinations of R, G, and B for which the color difference increases by an amount equal to or higher than a predetermined amount may be determined so that the test color image is can be printed with regard to all of these combinations. In other words, a combination of color signals for printing the test color image can be determined depending on the computation load or the memory capacity.

In this embodiment, each of the test color image data (R, G, B) determined in the manner as described above is composed of a plurality of pixels with a resolution of 600 dpi. The data for the plurality of pixels is data for which the combinations of R, G, B values for the test color image data are the same, thus providing a uniform color. The imago data (R, G, B) of the test color image is 8 bit image data subjected to the processing by the input color conversion processing section 403 shown in FIG. 4A. This data is converted by the ink color conversion section 405 to 8 bit ink color data C[X]. The ink color data C[X] is inputted to the HS processing section 406 via a bypass processing route shown by the broken line 410 in FIG. 4A without experiencing the processing by the MCS processing section 404. Another method is to allow, when the ink color data C[C] is not sent via the bypass processing route, the MCS processing section 404 to subject the ink color data C[X] to a correction processing by a table corresponding to the correction amount of 0 shown by the table parameter. In this case, the ink color data C[X] results in the same color signal prior to and after the correction by the MCS processing section 404. Thereafter, the data is subjected to the HS processing section 406, the TRC processing section 407, and the quantization processing section 408 to thereby obtain the test color image data composed of the dot data shown in FIG. 3B. Then, the test color image data is printed by the output section 409 on the printing paper 106. In order to provide simple description in the following description, a processing will described to prepare such table parameters only that correspond to the lattice points showing the image data of the to-be-measured blue image.

In the device image data D[X] and the ink color data C[X], X is a value that specifies a predetermined pixel region having a resolution of 600 dpi in the test color image data. For example, X is a value that specifies a pixel region corresponding to a nozzle group consisting of four consecutive nozzles arranged in the printing head of each ink color shown in FIG. 1 (hereinafter referred to as an area) based on a unit of 300 dpi. Thus, since the to-be-printed dots have a resolution of 1200 dpi corresponding to the resolution of the arranged nozzles, the value X specifies the two pixels for the device image data D[X] having the resolution of 600 dpi and the two pixels for the ink color data C[X] having the resolution of 600 dpi so as to correspond to one of the areas. The ink color data C[X] is subjected to the processings after that by the HS processing section 406 as described above. Then, the test color image of the data is printed by the output section 409.

Figure 6A:
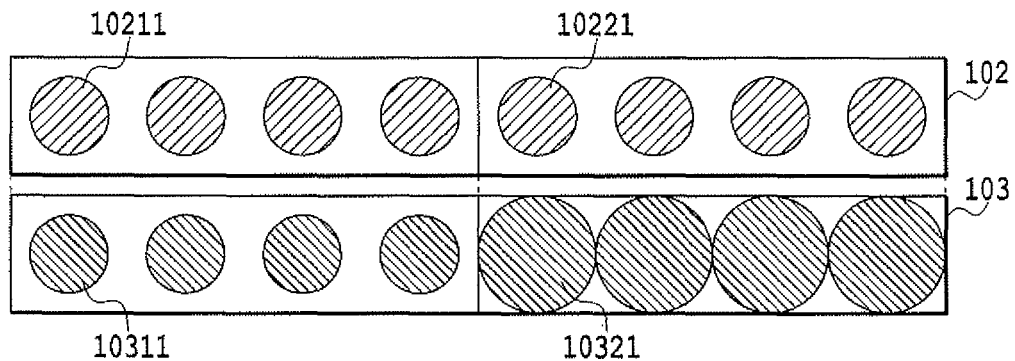
Figure 6B:
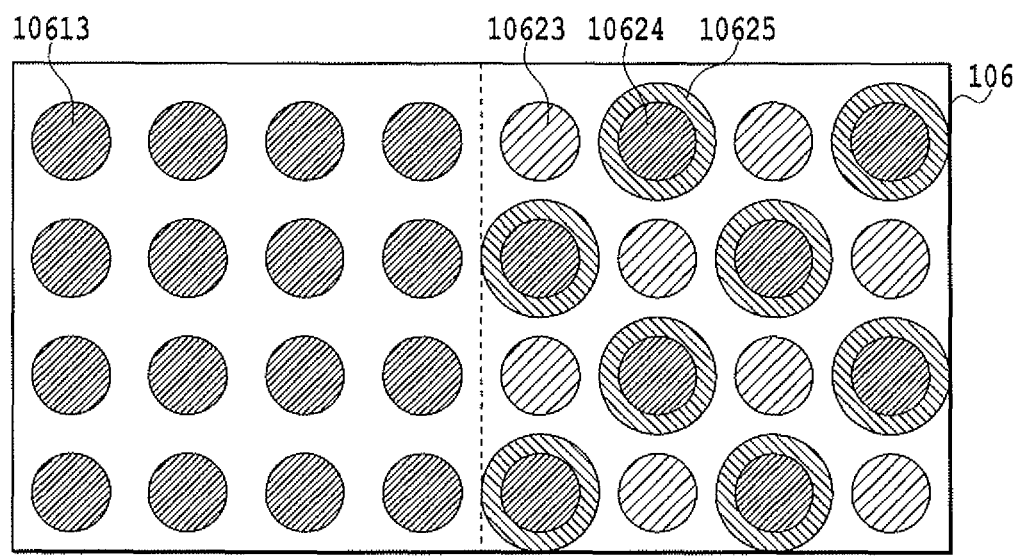

FIG. 6A and FIG. 6B illustrate the printing of the test color image in Step S502. In FIG. 6A and FIG. 6B, the same elements as those shown in FIG. 3A, FIG. 36, and FIG. 3C will be denoted with the same reference numerals and will not be described further.

FIG. 6A illustrates, as in FIG. 3A, a case where the right nozzle group in FIG. 6A among the nozzles of the magenta printing head 103 has a higher-than-standard ejection amount. In this case, the to-be-measured blue image shown in FIG. 6B is printed. Specifically, a color difference is caused in the right region in FIG. 6B. Thus, the resultant printed image has a blue color that is different from that of the left region.

With reference to FIG. 5A again, in Step S503, the color of the test color image printed on the printing paper 106 is measured as described above to thereby obtain color information B[X]. In this embodiment, the detection of this test color image (color measurement) is performed by allowing the test color image to be measured by the scanner 107 provided in the printer shown in FIG. 1. Thus, the processing in Step S503 includes a processing for receiving the scanner measurement data. This measurement also may be performed by allowing a user to operate the scanner 107 separately provided from the printer. This measurement also may be performed by connecting the scanner 107 to the printer so that the measurement result can be automatically sent from the scanner 107. Although the color information B[X] is represented by a combination of RGB values read by the scanner 107 in this embodiment, the color information B[X] also may take any data format such as L*a*b* measured by a color measurement unit.

In this embodiment, the measurement resolution is 600 dpi. The dots to be printed on the other, hand have a resolution of 1200 dpi corresponding to the resolution of the arranged nozzles. Thus, the above color measurement assumes, as 2 pixels, a region corresponding to four nozzles as a nozzle group shown in FIG. 6B and measures the region. Then, the color information B[X] is obtained on the basis of a unit of the region (the above-described area) corresponding to two pixels for this measurement. Specifically, in the color information B[X], X represents a value for specifying the area and is obtained as an average of the measurement result of the two pixels according to the measurement. In the example shown in FIG. 6B, the color information B[X] is acquired as the area corresponding to the left four nozzles in FIG. 6B and the area corresponding to the right four nozzles in FIG. 6B, respectively.

The to-be-measured blue image having the lattice points for which the device image data D[X] (R, G, B)=(0, 0, 255) is printed by ejecting ink through all nozzles of the cyan and magenta printing heads 102 and 103 shown in FIG. 1. Then, the color information B[X] is acquired on the basis of a unit of the area corresponding to a nozzle group consisting of four nozzles. FIG. 6B illustrates a partial area thereof. In the following description, it is assumed that the left area in FIG. 6B is the first area (X=1) and the right area in FIG. 6B is the second area (X=2). It is also assumed that the first area has color information of B[1]=(R1, G1, B1) and the second area has color information of B[2]=(R2, G2, B2). The example shown in the right area of FIG. 6B shows a case where all of the four magenta nozzles have a higher-than-standard ejection amount. There also may be a case where three of the four nozzles have a higher-than-standard ejection amount and the other one has a standard ejection amount for example. In this case, the value B[2] of the color information in the second area is different from the above one.

Next, in Step S504 of FIG. 5A, based on a target color A=(Rt, Gt, Bt) and the color information B[X] acquired in Step S503, a color difference amount T[X] of each area [X] is calculated. The target color A is color data obtained by measuring, by the scanner 107, the image printed by the printing head having a standard ejection amount for the respective color inks based on the same blue image data represented by (R, G, B)=(0, 0, 255) for example. In this embodiment, the measured color data has a resolution of 300 dpi as described above. Thus, data having a pixel resolution of 300 dpi is processed also in the above-described Step S504 and a processing for generating table parameters for the MCS processing section of Step S505 and Step S506 (which will be described later).

Specifically, the color difference amount T is represented as shown below.

Color difference amount $T[1]=B[1]-A=(R1-Rt, G1-Gt, B1-Bt)$

Color difference amount $T[2]=B[2]-A=(R2-Rt, G2-Gt, B2-Bt)$

In the formula, the color difference amount T[1] is a difference, in the example shown in FIG. 6B, between the blue color obtained by overlapping the cyan ink of the standard ejection amount and the magenta ink of the standard ejection amount in the left area in FIG. 6B and the blue color shown by the target color data A. The color difference amount T[1] is ideally zero if a measurement error for example is removed therefrom. Specifically, the relation of R1=Rt, G1=Gt, and B1=Bt is satisfied.

The color difference amount T[2] is a difference, in the example shown in FIG. 6B, between the blue color obtained the combination of the cyan ink of the standard ejection amount and the magenta ink of a higher-than-standard ejection amount in the right area of FIG. 6B and the blue color shown by the target color data A. For example, if the blue observed in the case of the combination of the cyan area 10623 and the magenta area 10625 has a stronger cyan color when compared with the target blue color, the color difference amount T[2] is a color difference amount showing an increased cyan color. For example, this is represented by the relation of R2=Rt, G2>Gt, and B2=Bt.

With reference to FIG. 5A again, in Step S505, based on the color difference amount T[X] of each area [X], a correction value $T^{-1}[X]$ is calculated. In this embodiment, a reverse conversion formula is simply used to obtain the following formula.

$T^{-1}[X]=-T[X]$

Thus, the correction values for the respective areas can be represented by the following formulae.

Correction value $T^{-1}[1]=-T[1]=A-B[1]=(Rt-R1, Gt-G1, Bt-B1)$

Correction value $T^{-1}[2]=-T[2]=A-B[2]=(Rt-R2, Gt-G2, Bt-B2)$

Here, the correction value $T^{-1}[1]$ corresponds to the left area of FIG. 6B and is ideally zero. The correction value $T^{-1}[2]$ on the other hand corresponds to the right area of FIG. 6B and is a correction value for reducing the cyan color in the above example. Specifically, in the case of G2>Gt, Gt−G2 results in a negative value to thereby reduce the cyan color.

Next, in Step S506 of FIG. 5A, based on the correction value $T^{-1}[X]$ of each area [X], an equivalence correction value $Y^{-1}[X]$ is calculated. Specifically, the correction value $T^{-1}[X]$ is a correction value for the blue color in the measurement color space. Thus, based on this correction value, the equivalence correction value $Y^{-1}[X]$ for correcting the blue color of the ink color space by the same amount is calculated. The equivalence correction value $Y^{-1}[1]$ corresponds to the left area of FIG. 6B and is ideally zero. The equivalence correction value $Y^{-1}[2]$ on the other hand corresponds to the right area of FIG. 6B and is a correction value for reducing the cyan color.

When the measurement color space and the ink color space can be subjected to a linear conversion, a known method such as matrix conversion as described below can be used to calculate a correction value.

$$Y^{-1}[1] = \begin{bmatrix} C1 \\ M1 \\ Y1 \\ K1 \end{bmatrix} = \begin{bmatrix} a1 & a2 & a3 \\ a4 & a5 & a6 \\ a7 & a8 & a9 \\ a10 & a11 & a12 \end{bmatrix} \times \begin{bmatrix} Rt - R1 \\ Gt - G1 \\ Bt - B1 \end{bmatrix} \quad [\text{Math 1}]$$

$$Y^{-1}[2] = \begin{bmatrix} C2 \\ M2 \\ Y2 \\ K2 \end{bmatrix} = \begin{bmatrix} a1 & a2 & a3 \\ a4 & a5 & a6 \\ a7 & a8 & a9 \\ a10 & a11 & a12 \end{bmatrix} \times \begin{bmatrix} Rt - R2 \\ Gt - G2 \\ Bt - B2 \end{bmatrix} \quad [\text{Math 2}]$$

In the formulae, a1 to a12 denote a conversion coefficient for converting the measurement color space to the ink color space. When a linear conversion between both color spaces cannot be performed, a known method such as a three dimensional lookup table method also can be used to calculate the following formulae.

$Y^{-1}[1]=H(Rt-R1, Gt-G1, Bt-B1)$ $Y^{-1}[2]=H(Rt-R2, Gt-G2, Bt-B2)$

In the formulae, H is a function to convert a measurement color space to an ink color space. The conversion relation of the lookup table is based on this function H.

When the relation between the correction value $T^{-1}[X]$ and the equivalence correction value $Y^{-1}[X]$ is different depending on the color, a known method such as a three dimensional lookup table method can be similarly used to calculate the following formulae.

$Y^{-1}[1]=H(Rt, Gt, Bt)-H(R1, G1, B1)$ $Y^{-1}[2]=H(Rt, Gt, Bt)-H(R2, G2, B2)$

In the formulae, H is similarly a function to convert a measurement color space to an ink color space.

In the manner as described above, with regard to lattice points selected as a significantly-changing color, table parameters as lattice point data can be calculated for each area [X] that is a predetermined region corresponding to one nozzle or a predetermined nozzle group. Then, table parameters of lattice points other than the above-selected lattice points can be calculated by interpolating the above-selected lattice points. This interpolation method may be a known method and will not be described further.

The equivalence correction value $Y^{-1}[X]$ functioning as table parameters of the respective lattice points calculated in the manner as described above is stored, with regard to each area [X], in the HDD 303 (FIG. 2) of the host PC so that the equivalence correction value $Y^{-1}[X]$ corresponds to the lattice points.

Next, the following section will describe the processing S520 performed by the MCS processing section 404 shown in FIG. 5B. Specifically, in a series of image processings by the respective processing sections shown in FIG. 4A, the MCS processing section 404 corrects the image data by a three dimensional lookup table for the respective areas having the correction value calculated in the manner as described above as lattice point data.

First, in Step S507, the ink color data C[X] is corrected by applying, to the ink color data C[X], the equivalence correction value $Y^{-1}[X]$ that is a table parameter for the MCS processing section prepared in the manner as described above.

First, whether the target pixel as a target of the image processing is included in any area of the above-described area [X] or not is determined. In the image processing, the pixel resolution is 600 dpi. The area [X] on the other hand has a resolution of 300 dpi. Thus, one area [X] corresponds to two pixels or two pixels belong to the one area [X].

When the value X of area [X]=n including the target pixel is obtained, such a table is referred that is retained in the HDD 303 by the combination of K, C, M, and Y shown by the target pixel data and the area [n] to thereby acquire the equivalence correction value $Y^{-1}[n]$ corresponding to the area. For example, when the combination of K, C, M, and Y shown by the image data of the target pixel is (0, 255, 255, 0) and shows a blue image, the equivalence correction value $Y^{-1}[n]$ for blue is obtained in the manner as described above. Then, the equivalence correction value $Y^{-1}[n]$ is applied to the image data of the target pixel to correct the data.

Specifically, the MCS processing section 404 applies, based on the following formulae, the equivalence correction value $Y^{-1}[X]$ to the ink color data C[X] corresponding to the area [X] to which the target pixel belongs to thereby generate corrected ink color data C' [X].

Ink color data $C'[1]=C[1]+Y^{-1}[1]$

Ink color data $C'[2]=C[2]+Y^{-1}[2]$

In the formulae, $Y^{-1}[1]$ represents, in the example of the blue shown in FIG. 6B, a correction value corresponding to the left area [1] shown in FIG. 6B and ideally has a value of zero as described above. Thus, the corrected ink color data C' [1] shows the same blue as that of the target color A. On the other hand, $Y^{-1}[2]$ represents, in the example of the blue shown in FIG. 6B, a correction value corresponding to the right area [2] shown in FIG. 6B and is a correction value for reducing the cyan color as described above. Thus, the corrected ink color data C' [2] shows blue for which the cyan color is reduced by correction when compared with the target color A.

Next, in Step S508, the ink color data corrected in the manner as described above is printed by the output section 409 on the printing paper 106 through the HS processing section 406, the TRC processing section 407, and the quantization processing section 408.

Figure 7A:
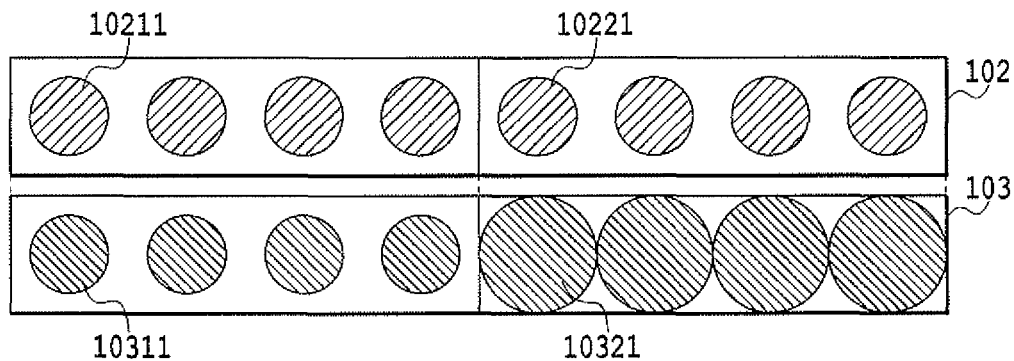
FIG. 7A and FIG. 7B illustrate the image printed by Step S508 of FIG. 58, respectively.

FIG. 7A and FIG. 78 illustrate the image printed by Step S508 of FIG. 58. As in FIG. 6A, FIG. 7A illustrates the ejection amount characteristics of the nozzles of the cyan and magenta printing heads 102 and 103. When this is subjected to a correction by the MCS processing, dots not overlapped with cyan dots are caused as in the magenta dots 10626 in the right area of FIG. 7B. The magenta dots 10626 exists, in the printing result subjected only to the HS processing shown in FIG. 6B, at positions where cyan dots are also printed. FIG. 73 shows that the ink color data C' [2] has a lower cyan color than the target color A and thus the number of cyan dots is consequently reduced.

Figure 7B:
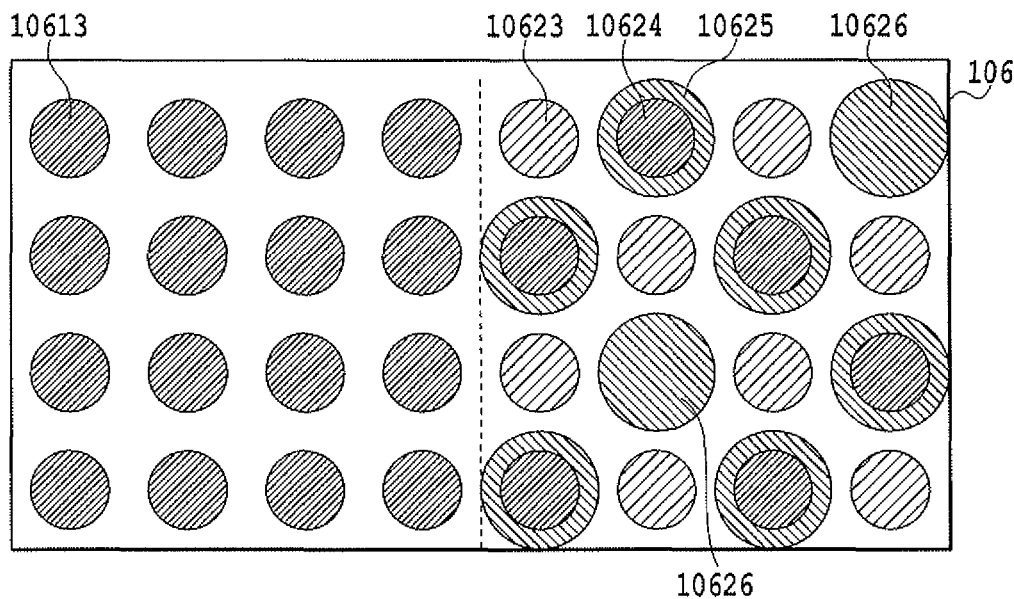

In the respective printing areas shown in FIG. 7B, the color difference amount T[X] is caused during printing by the variation of the ejection amount for example. This results in the following formulae.

Color information of the left area≈Color on the paper corresponding to $C'[1]+T[1]≈A$ Color information of the left area≈Color on the paper corresponding to $C'[2]+T[2]≈A$ In the formulae, C' [1] is ideally the same blue as the target color A and T[1] is ideally zero. C' [2] represents blue for which the cyan color corresponding to T[2] is reduced when compared with the target color A. T[2] represents a color difference amount for increasing cyan color. In the manner as described above, the left area and the right area can have substantially the same blue, thus reducing the color unevenness due to the color difference.

As described above, in this embodiment, with regard to a color for which the color difference of the multi dimensional color significantly changes, the test color image (patch) is printed on the printing medium and table parameters are calculated based on the measurement result. The reason is that the color difference amount causing the color difference depends on both of (1) the color printed on each printing region and (2) the printing characteristics of the respective color inks printed on the printing region. The printing region is a region obtained by separating a printable region on the printing medium into a plurality of parts. The printing characteristics of the respective ink colors (2) include not only the ejection amount as described above but also such factors that have an influence on the dot diameter such as the dot shape, the ink permeating rate, and the type of the printing medium. It is clear that the color difference amount depends on the combination of the printing characteristics of ink colors used to print the intended color and does not depend on the printing characteristics of ink colors not used for the intended color. Thus, the type and number of related ink colors are different depending on the color of the target pixel. Thus, some color may be related to one ink color only and may not cause a color difference amount.

The following section will, describe a case where the measurement color space completely matches the device color space. With regard to a simple color of cyan (C=255, M=0, Y=0, K=0) for example, the density is already uniform by the HS processing and thus no color difference is caused. Thus, no correction is desirably performed by the MCS processing section 404. Thus, the relation of the equivalence correction value $Y^{-1}[1]=Y^{-1}[2]=0=(0, 0, 0, 0)$ is desired. Similarly, in the case of a simple color of magenta (C=0, M=255, Y=0, K=0), the density is already uniform by the HS processing and thus no color difference is caused. Thus, no correction is desirably performed by the MCS processing section 404. Thus, the equivalence correction value is $Y^{-1}[1]=Y^{-1}[2]=0=(0, 0, 0, 0)$. With regard to the blue color (0=255, M=255, Y=0, K=0) on the other hand, as described above with reference to FIG. 3A, FIG. 3B, and FIG. 3C, there is a high possibility where a color difference is caused even with the HS processing. Thus, in the example shown in FIG. 6B, the following formulae are established.

Equivalence correction value $Y^{-1}[1]=0=(0, 0, 0, 0)$

Equivalence correction value $Y^{-1}[2]=H(Rt, Gt, Bt)-H(R2,G2,B2)$

Specifically, even when C=255 is established, the color difference amount is different depending on other combinations of M, Y, and K. Thus, an appropriate equivalence correction value is also different.

In other words, in the above preparation of the table, as lattice points for a color that tends to show a significant color difference, such lattice points are selected that has the above-described appropriate equivalence correction value as lattice point data. The MCS processing section 404 uses a three dimensional lookup table calculated based on the measurement result of the to-be-measured color image of the lattice points appropriately selected in the manner as described above.

The processing S510 for generating the table parameters for the MCS processing section also may be configured as shown below in another example.

Figure 8:
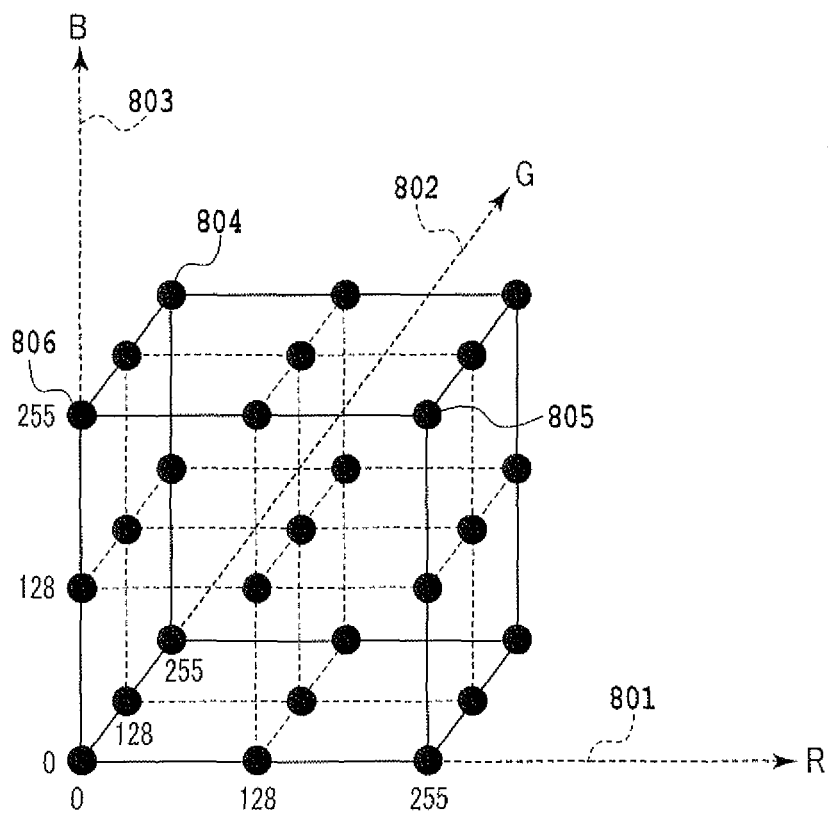
FIG. 8 illustrates another example of the processing by the MOS processing section for generating table parameters.

First, a plurality of patches (test color image) for which the values of the device image data R, G, and B are independently different are printed by the printing head shown in FIG. 1. FIG. 8 illustrates the distribution in the device color space of the colors of the total of 3×3×3=27 lattice points when each color has three gradations of 0, 128, and 255 and the colors are printed based on the data of the combinations thereof. FIG. 8 illustrates the RGB color space in which the reference numeral 801 denotes the red axis, the reference numeral 802 denotes the green axis, and the reference numeral 803 denotes the blue axis. Lattice points shown by black circles represent colors subjected to a patch printing. The lattice points shown by 804 to 806 show the colors that have been exemplarily described in the above embodiment. The reference numeral 804 denotes a cyan color, the reference numeral 805 denotes a magenta color, and the reference numeral 806 denotes a blue color, respectively.

Next, based on the color measurement result of the respective printed patches, with regard to the target color (Rt, Gt, Bt) corresponding to the lattice points (Ri, Gi, Ci) in the device color space, a patch of the color (Rp, Gp, Bp) that is closest to the target color is estimated from among the plurality of patches subjected to the color measurement. Next, the lattice points (Rn, Gn, Bn) corresponding to the patch (Rp, Gp, Bp) are calculated.

Then, a conversion coefficient G is used to calculate the ink color data (Ci, Mi, Yi, Ki) corresponding to the lattice points (Ri, Gi, Bi). The conversion coefficient G is also used to calculate the ink color data (Cn, Mn, Yn, Kn) corresponding to the patch device image data (Rn, Gn, Bn). Then, a correction table is prepared that is used to convert the ink color data (Ci, Mi, Yi, Ki) to (On, Mn, Yn, Kn). This procedure for preparing a correction table is carried out for each area [X].

In an actual case, known methods also can be used to improve the estimate accuracy such as the one for printing the data having more gradations than those shown in FIG. 8 to thereby improve the estimate accuracy or the one for interpolating a plurality of patches for the estimate.

In the above description, the value of the device image data (R, G, B) in FIG. 8 are independently changed and a plurality of patches are printed by an actual printing head. However, the respective pieces of the ink color data (C, M, Y, K) also may be independently changed to print a plurality of patches. In this case, when each ink color is printed by the three gradations of 0, 128, and 255, the total of 81 patches (=3×3×3×3) are consequently printed. Then, based on the patch color information obtained by subjecting the respective patches to a color measurement, the color (Rp, Gp, Bp) of the patch that is closest to the target color (Rt, Gt, Bt) corresponding to the ink color data (Ci, Mi, Yi, Ki) is estimated. Next, the ink color data (Cn, Mn, Yn, Kn) corresponding to the patch color is calculated. Then, a correction table for converting the ink color data (Ci, Mi, Yi, Ki) to (Co, Mn, Yn, Kn) may be prepared.

The MCS processing section 404 must be able to switch, in order to correct the color difference amount that depends on the ejection amount (the printing characteristic of (2)) of each color ink, the details of the correction depending on each printing region. For example, the MCS processing section may have a mechanism to retain a three dimensional lookup table corresponding to the number of the printing regions to switch the table in accordance with the printing region.

(Second Embodiment)

FIG. 4B is a block diagram illustrating the configuration of the image processing section in the second embodiment. As shown in FIG. 4B, this embodiment omits the HS processing section 406 shown in FIG. 4A.

In this example, the generation of the table parameters for the MCS processing section and the processing by the MCS processing section are the same as those of FIG. 5A and FIG. 5B according to the first embodiment. This embodiment is different in that the HS processing section is not subjected to the head shading. Specifically, the HS processing is not performed prior to Step S502 shown in FIG. 5A.

Figure 9A:
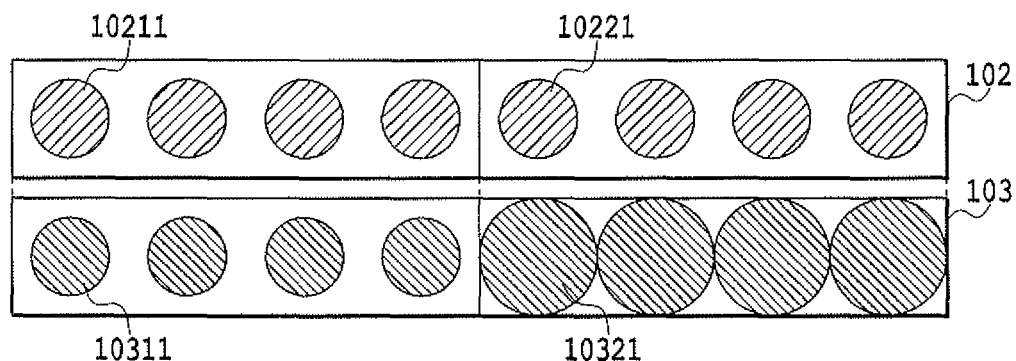
FIG. 9A and FIG. 9B illustrate an example of the printing of a test color image in Step S502 of FIG. 5A according to the second embodiment of the present invention, respectively.
Figure 9B:
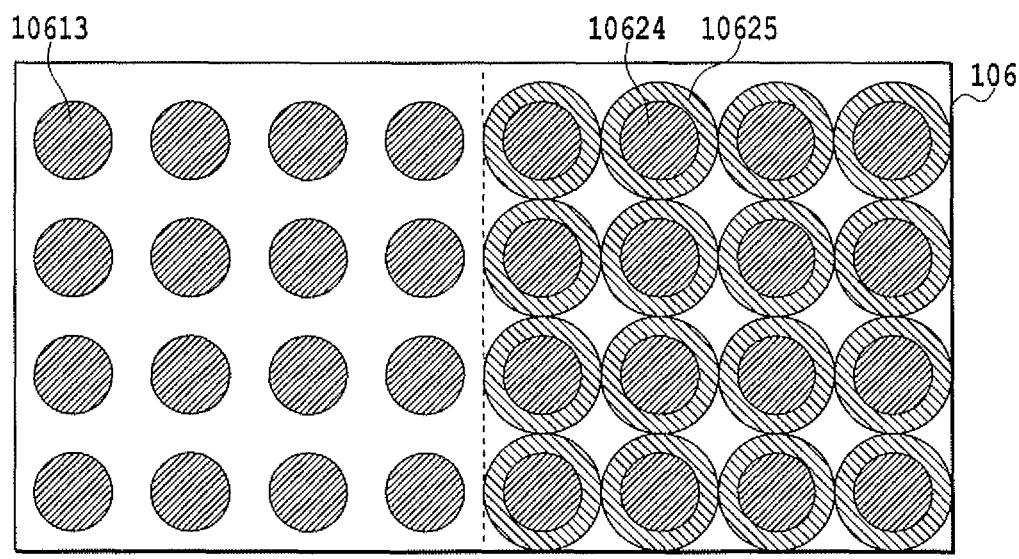

FIG. 9A and FIG. 9B illustrate an example of the test color image according to this example in Step S502 of FIG. 5A. FIG. 9A and FIG. 9B are diagrams similar to FIG. 6A and FIG. 6B. As shown in FIG. 9B, since the HS processing is not performed to print the test color image, the region corresponding to the left shown four nozzles has the same number of to-be-printed dots as that of the region corresponding to the right shown four nozzles. As a result, the color of the right region shows stronger magenta when compared with the example shown in FIG. 6B according to the first embodiment. As a result, the processing S510 of FIG. 5A for generating table parameters generates a correction value for reducing the magenta color. By doing this, a correction value for providing the printing result shown in FIG. 7B can be used as a table parameter of the MCS processing. Thus, the color difference can be reduced even when no HS processing is performed.

Furthermore, a direct effect by not performing the HS processing is that an improved processing speed leads to a reduced resource such as a table for the HS processing to thereby lead to reduced processing steps by not sequentially performing the printing, measurement, and correction parameter generation for the HS processing for example.

The first embodiment and the second embodiment have been described above. However, the respective processing details are a mere example. Any configuration can be used so long as the configuration can reduce the color difference as in an effect of the present invention. For example, the processing by the MCS processing section in FIG. 5A and FIG. 5B for generating table parameters has been performed by firstly measuring the color difference amount to subsequently calculate a correction value. However, other methods also may be used. Since the objective is to reduce the color difference, the setting of the target color A is not always required. Specifically, a correction value for each printing region also may be set based on the color difference among printing regions.

The above description has been description based on an assumption that a region corresponding to a nozzle group of four nozzles is one unit of area. However, the present invention is not limited to this. A region defined by more nozzles can be used as one nozzle group. A region defined by less nozzles (e.g., one nozzle) on the contrary also may be used as one nozzle group. Furthermore, the numbers of nozzles included in the individual areas do not always have to be the same number. Thus, the numbers of nozzles included in the individual areas may be appropriately set depending on the device characteristic. In a plurality of nozzle arrays for ejecting a plurality of inks, conversion tables may correspond to the respective combinations of nozzle groups for the printing on the same region on printing medium, respectively.

Another configuration also may be used where, among the reference numerals 403 to 407 shown in FIG. 4A and FIG. 4B, at least two consecutive processings are combined to provide one processing to thereby provide a higher-speed processing.

(Other Embodiments)

The above-described embodiment has described a case where inks of different colors of K, C, M, and Y are used to perform printing. However, the present invention is not limited to this. For example, there may be a case where, when gray is represented by overlapping black ink and gray ink to form density dots, the resultant gray has a color difference (i.e., density unevenness) due to the principle as described with reference to FIG. 3A and FIG. 3B. Such a color difference also can be reduced by the present invention. As described above, the present invention is not limited to different colors. The present invention can reduce, when a plurality of types of inks are widely used, the color difference in a multi dimensional color image caused by a difference of the printing characteristic among nozzles such as the variation of the ejection amount among the nozzles.

At least two types of inks may be used to print an image. For example, at least two of cyan, magenta, yellow, black, red, green, blue, orange, and violet inks may be used.

The present invention is also realized by performing the following processings. Specifically, software (program) for realizing the functions of the above-described embodiment can be supplied to a system or an apparatus via a network or various storage media so that the program can be read out and executed by a computer (or a CPU or a MPU for example) of the system or the apparatus. By reading the program by the computer, the computer can function as the above-described image processing apparatus.

Furthermore, the above embodiments have described an example in which the image data inputted in the RGB form as color signals of three primary colors was subjected to the MCS processing and then the data was converted to CMYK image data as color signals corresponding to a plurality of ink colors used in the printing apparatus. However, the present invention is not limited to this. The image data to be subjected to the MCS processing may take, in addition to the RGB form, any form such as L*a*b*, Luv, LCbCr, or LCH.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118670, filed May. 24, 2010, which is hereby incorporated by reference herein in its entirety.

What is claimed is:

1. An image processor for printing an image on a first area of a printing medium by using a first nozzle group including part of nozzles in a first nozzle array in which a plurality of first nozzles for ejecting a first ink are arranged and by using a second nozzle group including part of nozzles in a second nozzle array in which a plurality of second nozzles for ejecting a second ink having a color different from that of the first ink are arranged, and for printing an image on a second area different from the first area of the printing medium by using a third nozzle group including a nozzle different from the nozzle of the first nozzle group in the first nozzle array and by using a fourth nozzle group including a nozzle different from the nozzle of the second nozzle group in the second nozzle array, the image processor comprising:

a color conversion processing unit configured to convert R,G,B signals to input ink color signals corresponding to a plurality of inks, whose hues are different from each other, used for printing an image on the print medium;

a first conversion unit configured to (A) convert the input ink color signals for printing on the first area converted by the color conversion processing unit, including an input ink color signal corresponding to the first ink and an input ink color signal corresponding to the second ink, into output ink color signals for printing on the first area including an output ink color signal corresponding to the first ink and an output ink color signal corresponding to the second ink by using a first conversion table, and to (B) convert the input ink color signals for printing on the second area converted by the color conversion processing unit, including an input ink color signal corresponding to the first ink and an input ink color signal corresponding to the second ink, into output ink color signals for printing on the second area including an output ink color signal corresponding to the first ink and an output ink color signal corresponding to the second ink by using a second conversion table, wherein the first conversion table defines a correspondence relationship between a combination of values of the input ink color signals for printing on the first area and a combination of values of the output ink color signals for printing on the first area, and the second conversion table is different than the first conversion table and defines a correspondence relationship between a combination of values of the input ink color signals for printing on the second area and a combination of values of the output ink color signals for printing on the second area, such that a difference between a color of an image printed by using the first nozzle group and the second nozzle group in a case where predetermined input ink color signals are input and a color of an image printed by using the third nozzle group and the fourth nozzle group in the case where the predetermined input ink color signals are input is reduced;

a second conversion unit configured to (a) convert the output ink color signal of the first ink converted by the first conversion unit corresponding to the image to be printed on the first area and the output ink color signal of the first ink converted by the first conversion unit corresponding to the image to be printed on the second area, such that a difference between a density of an image printed on the first area by ejecting the first ink only from the first nozzle group in a case where a predetermined first output ink color signal is input and a density of an image printed on the second area by ejecting the first ink only from the third nozzle group in the case where the predetermined first output ink color signal is input is reduced, and to (b) convert the output ink color signal of the second ink converted by the first conversion unit corresponding to the image to be printed on the first area and the output ink color signal of the second ink converted by the first conversion unit corresponding to the image to be printed on the second area, such that a difference between a density of an image printed on the first area by ejecting the second ink only from the second nozzle group in a case where a predetermined second output ink color signal is input and a density of an image printed on the second area by ejecting the second ink only from the fourth nozzle group in the case where the predetermined second output ink color signal is input is reduced; and a generation unit configured to generate the first conversion table and the second conversion table on the basis of a result of a color measurement obtained by measuring a measurement image printed on the print medium by using the first ink and the second ink, the first conversion table being generated on a basis of a first result of color measurement of a first measurement image for the first nozzle group and the second nozzle group and the second conversion table being generated on a basis of a second result of color measurement of a second measurement image for the third nozzle group and the fourth nozzle group, the second result of color measurement being different from the first result of color measurement, wherein responsive to a case where the generation unit generates the first conversion table and the second conversion table, parameters for the second conversion unit are updated, and thereafter, the first measurement image is printed by the first nozzle group and the second nozzle group according to an ink color signal of the first ink and an ink color signal of the second ink for the first measurement image converted by the second conversion unit with the updated parameters and the second measurement image is printed by the third nozzle group and the fourth nozzle group according to an ink color signal of the first ink and an ink color signal of the second ink for the second measurement image converted by the second conversion unit with the updated parameters.

2. The image processor according to claim 1, wherein each of the first ink and the second ink is any one of colors of cyan, magenta, yellow, and black.

3. The image processor according to claim 1, wherein the plurality of input color signals input to the first conversion unit include C, M, Y signals.

4. The image processor according to claim 1, wherein the plurality of color signals converted by the first conversion unit include C, M, Y signals.

5. The image processor according to claim 1, wherein the first nozzle group and the third nozzle group correspond to a predetermined number of nozzles in the first nozzle array, and the second nozzle group and the fourth nozzle group correspond to a predetermined number of nozzles in the second nozzle array.

6. The image processor according to claim 5, wherein the predetermined number is one.

7. The image processor according to 1, further comprising a measurement unit configured to measure a color of the printed measurement image.

8. The image processor according to claim 1, wherein the color difference that is reduced by the first conversion unit is generated due to a difference between a combination of an ejecting characteristic of the first nozzle group with an ejecting characteristic of the second nozzle group and a combination of an ejecting characteristic of the third nozzle group with an ejecting characteristic of the fourth nozzle group.

9. The image processor according to claim 8, wherein the characteristics of the first, second, third and fourth nozzle groups indicate ejection amounts ejected from the nozzle groups.

10. The image processor according to claim 1, further comprising a print unit including the first nozzle array and the second nozzle array.

11. The image processer according to claim 1, further comprising a storing unit configured to store the first and second conversion tables.

12. The image processer according to claim 1, further comprising a quantization processing unit configured to convert the output ink color signals converted by the second conversion unit to dot data indicating positions of ink dots printed in the first area and the second area.

13. An image processing method for printing an image on a first area of a printing medium by using a first nozzle group including part of nozzles in a first nozzle array in which a plurality of first nozzles for ejecting a first ink are arranged and by using a second nozzle group including part of nozzles in a second nozzle array in which a plurality of second nozzles for ejecting a second ink having a color different from that of the first ink are arranged, and for printing an image on a second area different from the first area of the printing medium by using a third nozzle group including a nozzle different from the nozzle of the first nozzle group in the first nozzle array and by using a fourth nozzle group including a nozzle different from the nozzle of the second nozzle group in the second nozzle array, the image processing method comprising:

a color conversion processing step of converting R,G,B signals to input ink color signals corresponding to a plurality of inks, whose hues are different from each other, used for printing an image on the print medium;

a first conversion step of (A) converting the input ink color signals for printing on the first area converted in the color conversion processing step, including an input color signal corresponding to the first ink and an input color signal corresponding to the second ink, into output color signals including an output color signal corresponding to the first ink and an output color signal corresponding to the second ink by using a first conversion table, and (B) converting the input ink color signals for printing on the second area converted in the color conversion processing step, including an input ink color signal corresponding to the first ink and an input ink color signal corresponding to the second ink, into output ink color signals for printing on the second area including an output ink color signal corresponding to the first ink and an output ink color signal corresponding to the second ink by using a second conversion table, wherein the first conversion table defines a correspondence relationship between a combination of values of the input ink color signals for printing on the first area and a combination of values of the output ink color signals for printing on the first area, and the second conversion table is different than the first conversion table and defines a correspondence relationship between a combination of values of the input ink color signals for printing on the second area and a combination of values of the output ink color signals for printing on the second area, such that a difference between a color of an image printed by using the first nozzle group and the second nozzle group in a case where predetermined input ink color signals are input and a color of an image printed by using the third nozzle group and the fourth nozzle group in the case where the predetermined input ink color signals are input is reduced;

a second conversion step of (a) converting the output ink color signal of the first ink converted in the first conversion step corresponding to the image to be printed on the first area and the output ink color signal of the first ink converted in the first conversion step corresponding to the image to be printed on the second area, such that a difference between a density of an image printed on the first area by ejecting the first ink only from the first nozzle group in a case where a predetermined first output ink color signal is input and a density of an image printed on the second area by ejecting the first ink only from the third nozzle group in the case where the predetermined first output ink color signal is input is reduced, and (b) converting the output ink color signal of the second ink converted in the first conversion step corresponding to the image to be printed on the first area and the output ink color signal of the second ink converted in the first conversion step corresponding to the image to be printed on the second area, such that a difference between a density of an image printed on the first area by ejecting the second ink only from the second nozzle group in a case where a predetermined second output ink color signal is input and a density of an image printed on the second area by ejecting the second ink only from the fourth nozzle group in the case where the predetermined second output ink color signal is input is reduced; and a generation step of generating the first conversion table and the second conversion table on the basis of a result of a color measurement obtained by measuring a measurement image printed on the print medium by using the first ink and the second ink, the first conversion table being generated on a basis of a first result of color measurement of a first measurement image for the first nozzle group and the second nozzle group and the second conversion table being generated on a basis of a second result of color measurement of a second measurement image for the third nozzle group and the fourth nozzle group, the second result of color measurement being different from the first result of color measurement, wherein responsive to a case where the generation step generates the first conversion table and the second conversion table, parameters for the second conversion step are updated, and thereafter, the first measurement image is printed by the first nozzle group and the second nozzle group according to an ink color signal of the first ink and an ink color signal of the second ink for the first measurement image converted by the second conversion step with the updated parameters and the second measurement image is printed by the third nozzle group and the fourth nozzle group according to an ink color signal of the first ink and an ink color signal of the second ink for the second measurement image converted by the second conversion step with the updated parameters.

\* \* \* \* \*